Aug. 22, 1933.  O. U. ZERK  1,923,408
LUBRICATING APPARATUS
Filed Nov. 9, 1929
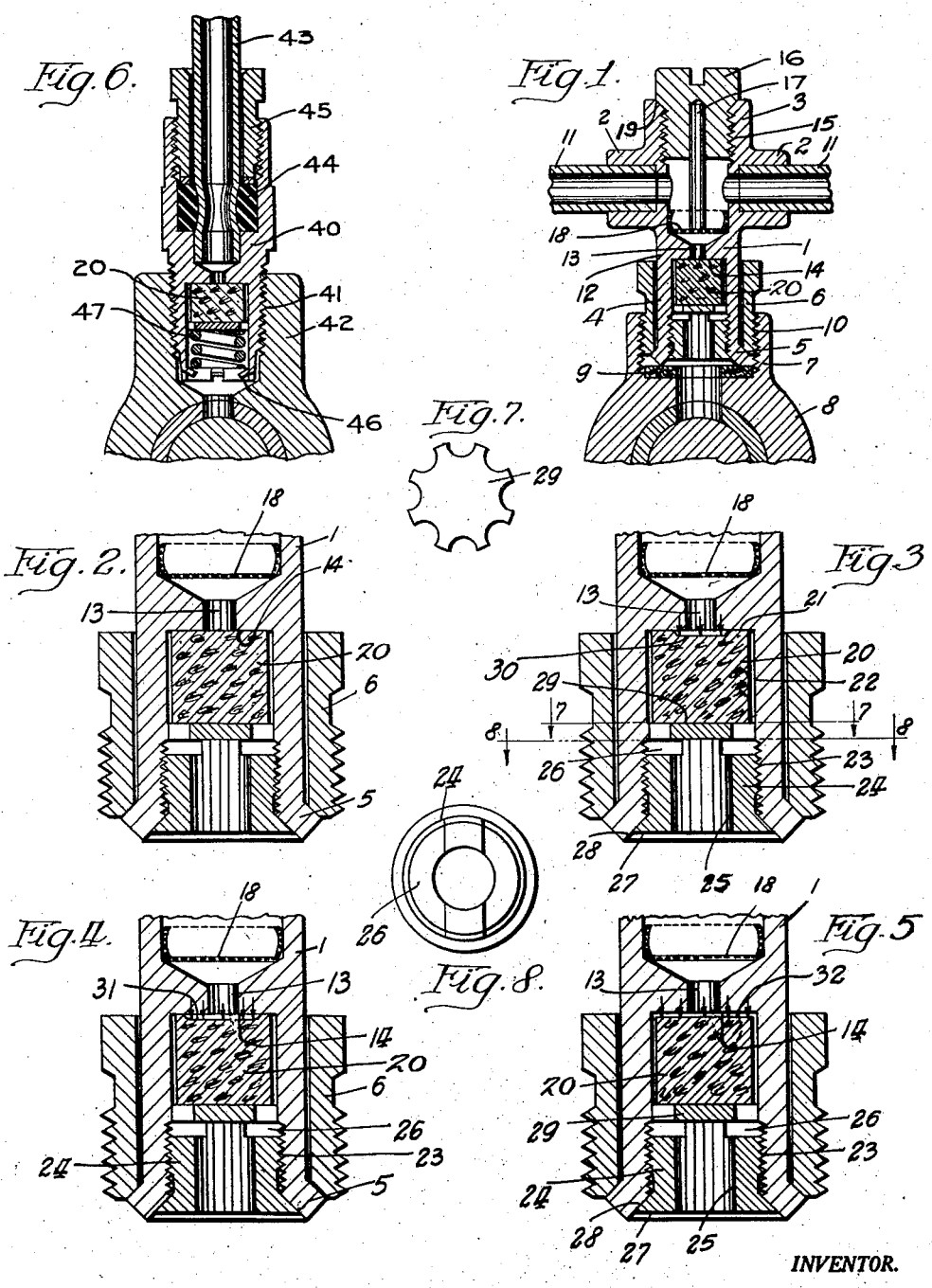
INVENTOR.
Oscar U. Zerk Patented Aug. 22, 1933

1,923,408

UNITED STATES PATENT OFFICE 1,923,408

LUBRICATING APPARATUS

Oscar U. Zerk, Chicago, Ill., assignor to Alemite Corporation, Chicago, Ill., a Corporation of Delaware Application November 9, 1929. Serial No. 406,111

9 Claims. (Cl. 184—7)

My invention relates to lubrication, and more particularly relates to lubrication by so-called centralized lubricating system in which a plurality of bearings are lubricated from a common central source and is particularly applicable to the lubrication of the chassis of vehicles, such as automobiles, tractors, gun carriages, war tanks, locomotives, aeroplanes, air ships, sea vessels and the like.

Prior systems of centralized lubrication have commonly employed an oil pump connected to an oil reservoir, a system of pipe lines leading from the pump to the bearings to be lubricated, and metering or dispensing units interposed between the pipe lines and the various bearings.

In such prior systems, various types of metering units have been employed, such as the so-called pressure reservoir type, measuring valve type and resistance unit type. In the centralized lubricating system to which my invention pertains, the metering unit is of the resistance unit type.

In such prior systems of centralized lubrication employing resistance type metering units, provision is made to periodically operate the oil pump to intermittently or periodically apply pressure to the lubricant in the system of pipe lines leading to the resistance metering units to cause them to correspondingly periodically emit or dispense lubricant to the bearings to be lubricated.

The means for thus giving periodic pulsations of pressure to the lubricant in the system is not an essential part of my present invention. Any known or suitable means for this purpose may be employed. For a characteristic example of suitable pump and pump actuating means of this type, reference may be had to my co-pending applications, Serial No. 406,197 filed November 9, 1929, and Serial No. 406,110 filed November 9, 1929.

My present invention relates particularly to an improved metering unit of the resistance type and its adaptation to being connected to the bearing or bearing elements to be lubricated and to the system of lubricant supply pipe lines.

Various metering units of the resistance type are employed in prior art lubrication systems. The position of these units in the development of the art and the defects thereof and difficulties encountered therewith are set forth in my co-pending application, Serial No. 406,110 and reference may be had thereto for a more complete discussion thereof.

In even the simplest of such resistance metering units, complications have resulted due to the necessity of providing not only a valve or plug unit to provide the necessary resistance but in addition a check valve to prevent lubricant from flowing in the reverse direction due to siphoning or other causes.

In the metering unit of the resistance type of my present invention, however, I avoid the difficulties above referred to in a very simple and inexpensive manner by means preferably comprising but a single resilient compressible valve element or plug to take the place of both the incompressible metal resistance plug and the separate check valve unit of the former and probably most nearly satisfactory and successful resistance units of the prior art.

In my co-pending application, Serial No. 406,110 above referred to, I show and describe a metering unit of the resistance type in which a resistance plug made of resilient material such for example as cork is compressibly fitted into the lubricant outlet of the lubricant dispensing or metering unit to normally seal the same against leakage of oil in the direction of flow toward the bearing and also against siphoning of the oil in the reverse direction and upon the occurrence of an impulse of pressure in the lubricant above a predetermined value, the resilient plug is inwardly compressed by the lubricant pressure, reducing its diameter from end to end progressively in the direction of flow of the lubricant, to permit a small quantity of lubricant to pass the plug and flow to the bearing. The plug is generally of cylindrical form and is press-fitted into a hollow cylindrical wall in the fitting secured to the bearing.

It is thus one of the important advantages of the resistance unit of said application that the plug-like valve and its seat are opened "progressively"; that is to say, the valve element or plug is not moved bodily away from the seat, but in the valve opening action a small portion of the seat is first uncovered and the amount of uncovering progressively becomes larger and larger, a diminishing portion of the seat remaining sealed throughout the progressive action.

The valve thus is not opened to dispense lubricant until the contact or sealing area between the valve and the seat has thus been progressively decreased until the entire contact and seal are finally broken.

Upon the return of the lubricant pressure to a value below a predetermined value, the expansible plug or cork expands to again seal the bore of the fitting from end to end of the cylindrical plug.

In the present invention a plug or valve element of compressible or resilient material, such for example as cork, is formed to seal the bore or conduit of the lubricant fitting on mutually engaged surfaces which are substantially at an angle to the direction of flow of the lubricant; and the sealing contact area is likewise caused to be progressively diminished in directions at an angle to the direction of flow of lubricant; and the sealing pressure at the contact area between the resilient plug and the seat in the bore or conduit of the fitting may be predetermined by compacting or clamping it between opposing parts of the fitting to any desired degree.

Thus, a valve of compressible material is compressibly pressed or clamped upon the valve seat between the seat and a suitable clamping device to seal the valve seat at fluid pressure in the conduit below a predetermined value; and at fluid pressures above a predetermined value, the fluid pressure at the valve seat compresses the material of the valve sufficiently to permit flow of the fluid between the valve and the valve seat. The valve seat is disposed substantially transversely of the conduit to seal the same and the compressing of the valve by the high fluid pressure progresses outwardly radially with respect to the conduit progressively diminishing the thickness of the valve between the clamp and valve seat.

It is, therefore, one of the objects of this invention to provide an improved metering unit of the resistance type for centralized lubricating systems in which a valve element normally positively seals the unit against flow of fluid in either direction therethrough toward or from the bearing to be lubricated except at fluid pressures above a predetermined value.

Another object is to provide a metering unit of the resistance type in which the closure seal is effected by a valve element and a valve seat, one of which is composed of compressible material and mutually engaged on a contact area and with the compressible element normally under a predeterminable compression.

Another object is to provide a metering unit of this type in which the valve element is composed of resilient or compressible material and compressed between the valve seat and a relatively movable clamp element to seal the valve on the seat.

Another object is to provide a metering unit of the resistance type in which a valve seat disposed generally transversely of the direction of flow of the lubricant is sealed by a compressible valve element compressed thereon.

Another object is to provide a metering unit of the resistance type in which a compressible valve element is normally compressed to a predetermined degree by clamping it between a valve seat and a clamp element or abutment to seal the seat against normal fluid pressures and in which the valve element may be compressed to unseal the valve seat by fluid pressure above a predetermined value.

Another object is to provide a resistance type metering unit having a conduit therein and a transversely disposed valve seat providing a substantially annular valve seating contact area and a valve element of compressible material compressed upon the valve seat by clamping means to a predetermined degree of pressure, the valve element being adapted to be radially outwardly progressively further compressed by fluid pressure above a predetermined value to unseal the valve seat and permit fluid to flow therethrough.

Another object is to provide a metering unit of the resistance type for lubricating systems in which the end of a fluid conduit or a shoulder therein serving as a valve seat, is sealed against pressure of lubricant in the conduit when below a predetermined value by a valve element forcibly held upon the seat and in which at pressure above a predetermined value the valve element is not moved bodily from the valve seat but the material thereof is compressed by the fluid pressure sufficiently to allow lubricant to escape laterally between the valve element and the valve seat.

Other objects of my invention and the invention itself will be more apparent from the following description of certain embodiments of my invention wherein reference is had to the accompanying drawing illustrating the said embodiments.

In the drawing:

Fig. 1 is a medial cross-sectional view of a resistance type metering unit embodying my invention and shown connected to a bearing element to be lubricated and to lubricant supply pipes.

Figs. 2, 3, 4 and 5 are fragmentary views similar to Fig. 1 drawn to a larger scale in some respects diagrammatic and illustrating successively the progressive compression of a compressible valve element which I may employ during the action of opening the seal between a valve element and valve seat.

Fig. 6 is a view similar to Fig. 1 showing another embodiment of my invention;

Fig. 7 is a view of a part of the embodiment of Fig. 3 taken from the plane 7—7 of that figure; and Fig. 8 is a view taken from the plane 8—8 of Fig. 3.

Referring to Fig. 1, I have shown at 1 the main body fitting which, in the embodiment shown, is generally of cylindrical form having laterally projecting bosses 2—2, a head boss 3 and a dispensing outlet tube 4. The lower end of the tube 4 is outwardly flared as at 5 and by means of a clamp nut 6 surrounding the tube 4, and bearing at its lower end on the flange 5 and threaded as at 7 into a recess 10 in a bearing element 8 to be lubricated, the flared end 5 of the tube may be clamped in the bearing element 8, and sealed therein upon a sealing washer 9 in the recess 10 engaged by the flared end 5 of the tube.

Oil supply pipes 11—11 forming part of the centralized lubricating system in connection with which the pressure metering unit of my invention is employed are rigidly and in a leak proof manner secured in the bosses 2 by known means and methods, and communicate with the interior of the outlet tube 4.

Below the center line of the supply pipes 11, the tube 4 is provided with a transverse partition 12 substantially at the center of which is a lubricant port 13. The lower face of the partition 12 is preferably planar and smoothly finished to form a valve seat 14, which in the preferred form of my invention is planar, but not essentially so, inasmuch as the advantages of my invention to be described may be effectively carried out with a valve seat 14 which is conical or curved convexly or concavely. The interior of the tube 4 above the partition 12 terminates upwardly in a screw threaded opening 15 into which is screw-threaded a plug 16 to close and seal the opening 15.

Centrally connected to the plug 16 and projecting downwardly into the tube 4 is a stem 17 on the lower end of which is secured a lubricant screen or strainer 18. Thus, by removing the plug 16, the screen or strainer 18 may be removed for cleaning or inspection and replaced and the plug 16 effecting a leak proof seal with the head boss 3 along mutually engaged conical sealing surfaces at 19.

A valve element 20 composed of cork or cork composition or like resilient compressible and non-flowing material and generally of cylindrical form is seated on the valve seat 14 with a planar face 21 of the valve element in sealing engagement with the seat.

In the modifications referred to above and not shown, in which the valve seat 14 is formed otherwise than planar, the valve face 21 may correspondingly be formed and in any case preferably coincides with the valve seat 14, thus providing a relatively large transversely disposed valve sealing area.

The valve element 20 is of slightly smaller diameter than the bore of the tube 4 below the partition 12 to give clearance as at 22 between the valve and the wall of the tube 4.

The lower end of the tube 4 is internally threaded as at 23 to receive a tubular clamp nut 24 having an axial bore 25 and provided with radial grooves 26 in its inner end. The nut 24 has a head 27 of flared form to engage the flange 5 as at 28 to determine its inwardly screwed position. Clamped between the lower end of the valve element 20 and the inner end of the nut 24 and bridging the grooves 26 is a pressure washer 29.

By means of the construction just described, and by suitable proportioning of parts, when the clamp nut 24 is screwed in until its head bottoms on the flange 5 at 28, the nut 24 acting through the washer 29 may compress the valve element 20 into the sealing engagement with the valve seat 14 as above described with any predetermined desired degree of pressure and of compression of the valve element 20 itself. The actual degree of pressure may be varied at any time by providing a washer 29 of different thickness.

The foregoing construction thus provides in the fitting 1 a lubricant conduit comprising the opening 15, port 13, the clearance space 22, grooves 26 and bore 25 through which lubricant may flow from the supply pipes 11 to the bearing element 8 to be lubricated; and said conduit is normally closed and sealed by the sealing contact between the surfaces 14 and 21 above referred to. Upon the occurrence of an impulse of pressure in the supply pipes 11 above a predetermined value, the valve element 20 and seat 14 are unsealed in a manner which will now be described to permit lubricant to flow through the conduit.

Referring to Figs. 2 to 5 inclusive, in Fig. 2, the parts are shown with the face 21 of the valve in full sealing engagement with the valve seat 14. Upon the occurrence of lubricant pressure in the port 13 above a predetermined value, the surface 21 of the valve element 20 at substantially the center thereof is compressed as shown by the depressed area 30 in Fig. 3, the arrows indicating the direction of fluid pressure. Upon a continuance of the pressure of the predetermined value, the depressed area 30 progressively expands laterally or radially with respect to the axis of the conduit and of the valve seat 14 and in its enlarged state is shown at 31 in Fig. 4; and finally the depressed or compressed area spreads or expands outwardly progressively until as shown at 32 in Fig. 5 it is co-extensive with the area of the face 21 itself.

In other words, the seal effected between the faces 21 and 14 of the valve and seat respectively is progressively broken starting at substantially the center of the faces and progressively is destroyed, the area in sealing contact progressively diminishing until the area of contact vanishes.

Lubricant may now flow out of the port 13 over the upper end of the valve element 20 and into the clearance space 22 and so on to the bearing to be lubricated. Upon a cessation of the predetermined high pressure, the inherent resilient quality of the valve element 20 will cause it to expand and return to its original position and again effecting seal upon the seat 14.

The predetermined pressure necessary thus to progressively open the valve seal may be varied as desired by varying the initial degree of compression on the valve element 20, as above described.

Referring to the embodiment of my invention shown and described in Fig. 6, a fitting having a body 40 is provided screw threaded as at 41 into the bearing element 42 to be lubricated. In this form only a single supply pipe 43 is provided and sealed in the body 40 by a compressible packing washer 44 and a gland compressing nut 45 screw threaded into the body 40.

In this form the port 13, valve seat 14 and valve element 20 and compression washer 29 may be similar to those of the form shown in Fig. 1. To provide the initial or normal degree of compression of the valve element 20, however, the lower end of the body 40 is notched to provide tongues 46 bent inwardly to provide an annular set of abutments; and between the tongues 46 and the compression washer 29 a heavy compression spring 47 is disposed and by reacting upon the tongues 46 and washer 29 provides the said initial or normal degree of compression to the valve element 20.

In this form, as will be obvious, any tendency of the valve element to set or become compacted will automatically be taken up by the expansion of the spring 47. Lubricant flowing through the clearance space 22 may freely flow through the convolutions of the spring 47.

Having thus described my invention in certain embodiments, I am aware that numerous and extensive departures may be made from the embodiment herein illustrated and described but without departing from the spirit of my invention.

I claim:

1. In a metering unit, a lubricant port, a valve seat around the port, a valve element of compressible material forcibly pressed into sealing engagement with the seat and adapted to be compressed in the direction of fluid flow in the port progressively laterally.

2. In a lubricating system, a tubular element, a transverse wall in the tube, a port in the wall, means for supplying lubricant under pressure to one side of the port, a valve element of compressible material, compressed against the other side of the port to normally seal it and adapted to be further compressed by fluid pressure above a predetermined value to unseal the port.

3. In a lubricating system, a tubular lubricant fitting, a transverse wall in the tube, a port in said wall, means for supplying lubricant under pressure to one side of the port, means for sealing the other side of the port comprising a valve element of compressible material, of larger transverse section than the port forcibly compressed against the port to seal it and adapted to be further compressed on a radially outwardly progressively increasing area to unseal the port.

4. In a lubricating system, a tubular lubricant fitting, a transverse wall in the tube, a port in the wall, an opening in the tube, a sealing plug therefor, a lubricant screen for the port connected to the plug and insertable and removable therewith, means for supplying lubricant to the port through the screen under pressure, means for sealing the other side of the port comprising a valve element of compressible material of smaller transverse section than the tube bore compressibly held on the port to seal it by means reacting on the tube wall.

5. In a metering unit, a fluid port, a valve element of compressible material, clamping means for clamping the valve on the port to seal it, and means between said clamping means and said compressible material for adjustably varying the degree of compression thereof.

6. In a lubricant metering unit, a conduit portion terminating in an annular valve seat, a valve element of compressible material forcibly held on the seat to seal it against fluid pressure in the conduit below a predetermined value and adapted to be further compressed by fluid pressure above a predetermined value to unseal the conduit.

7. In a metering unit, a lubricant port, a valve seat around the port, a valve element of compressible material forcibly pressed into sealing engagement with the seat and adapted to be further compressed by fluid pressure in the port above a predetermined value to unseal the port.

8. In a metering unit, a lubricant port, a valve seat around the port, a valve element of compressible material forcibly pressed into sealing engagement with the seat and adapted to be further compressed progressively to ensmall said element.

9. In a metering unit, a fluid port, an annular seat surrounding the port, a valve element of compressible material normally compressed upon the seat to seal it and adapted to be further compressed adjacent the seat along a progressively thinning annular surface to unseal the seat.

OSCAR U. ZERK.